INVENTORS
ROBERT B. LAIBOWITZ
ABRAHAM A. LEVI
ROBERT ROSENBERG

BY Bernard N. Wiener
ATTORNEY

United States Patent Office 3,806,430
Patented Apr. 23, 1974

3,806,430
METHOD FOR FABRICATING ANODIC FILMS

Robert B. Laibowitz, Peekskill, Abraham A. Levi, Monsey, and Robert Rosenberg, Peekskill, N.Y., assignors to International Business Machines Corporation, Armonk, N.Y.

Filed June 16, 1970, Ser. No. 46,677
Int. Cl. C23b 9/00
U.S. Cl. 204—32 R 23 Claims

ABSTRACT OF THE DISCLOSURE

A method is disclosed for producing defect-free ultra-thin anodic oxide films of less than approximately 50 A. thickness. Illustratively, a thin insulating film is formed on a niobium substrate. A residual oxide having a thickness of about 30 A. is normally present on the niobium substrate. The residual oxide film is removed prior to anodizing, leaving a more uniform niobium substrate. By anodizing under controlled conditions any desired oxide dimension less than approximately 50 A. may be achieved by the practice of this disclosure. The method comprises anodizing the niobium substrate in a suitable electrolyte with an applied potential up to approximately 1 volt, and subsequently removing the resultant oxide by etching with a suitable etchant, e.g., HF, and $HF+HNO_3$. The anodizing-etching steps are preferably repeated to remove surface cavities and growths for obtaining a surface on the niobium substrate with desired uniformity. Illustratively, the final anodization of the niobium surface is achieved by connecting the two electrodes of the electrolytic cell (the niobium surface and the cathode) through a constant current source to achieve the desired final thickness of the anodic film. Alternatively, the electrodes may be connected to each other through a resistor for controlling the rate of anodic film growth.

BACKGROUND OF THE INVENTION

For certain types of devices of relatively recent origin based on electron tunneling, e.g., Josephson tunneling devices, it is necessary to fabricate defect-free ultra-thin insulating films in the approximate thickness range 0 to 50 A. In many cases, thermal oxidation of the base metal to form a natural oxide results in an oxide layer which is either too thick for a particular application, reacts with the metal to alter the properties of interest, or contains defects which destroy the metal-oxide-metal tunneling junction characteristics. Illustratively, such a system is niobium-niobium oxide where the residual thermal oxide is porous and interacts with the niobium thereby lowering the superconducting transition temperature $T_c$. Reproducible anodic films with thicknesses less than approximately 50 A., and more generally less than several hundred angstroms have not been satisfactorily provided by the prior art. The prior art fabrication of anodic films has been concerned with producing and testing of relatively thick anodic films which were usually thicker than 300 A. and always thicker than 50 A.

Presently, fabrication of very thin insulating films is by thermal oxidation. However, thermal oxidation is of use only for those materials which form a protective oxide naturally, e.g., lead, tin and aluminum. Many other materials such as niobium, tantalum, titanium and molybdenum, are much more difficult to uniformly oxidize thermally and have not been used extensively for devices because thermal oxidation thereof causes diffusion of oxygen which destroys physical properties such as superconductivity.

ADVANTAGES OF THE INVENTION

Exemplary advantages of this invention are as follows:

(a) Anodic films may be deposited at room temperature and below without the heating of the substrate which is required for prior art thermal oxidation. The prior art thermal oxidation of a substrate is often harmful to the superconducting properties of many superconductors because deleterious diffusion of the oxygen into the metal also occurs during the heating.

(b) Fabrication of ultra-thin anodic insulators by practice of this invention permits material such as Nb to be used for a Josephson tunneling device. Nb has high $T_c$, is a refractory metal and, therefore, it is superior to Pb or Sn for such a use.

(c) Defects such as cavities and hillocks are eliminated from the surface of the substrate during the fabrication procedure. These defects often cause device failure by producing insulator inhomogeneities.

(d) Practice of this invention achieves control of insulator thickness during growth which is necessary for obtaining reproducible devices.

(e) Damaged surface regions on a substrate are removed by practice of this disclosure.

There is usually present a thin film, e.g., 30 A. of poor quality residual oxide on the substrate. Practice of the method of this invention removes such a film before the anodic film is grown. This is highly desirable because such a residual film is often too thick for some applications such as the fabrication of Josephson tunneling devices. The anodic film provided hereby may be grown at a controlled rate to the desired thickness.

Surface inhomogeneities such as hillocks on a substrate are removed by the anodizing and etching steps of this invention. This invention is applicable to batch fabrication of devices and it also provides good edge coverage and passivation of metal surfaces.

Standard anodization techniques use the metal to be anodized as the positive electrode in an electrolytic cell containing an acid, base or salt solution as the electrolyte and platinum, carbon, or hydrogen as the negative electrode. Heretofore, the formation of relatively thick anodic films, e.g., greater than 300 A., have been studied as have been the details of applied voltages in the range greater than approximately 20 volts for normal anodization. It has been discovered for the practice of this invention that a residual oxide thickness of approximately 30 A. is normally present on niobium resultant from thermal oxidation. This thickness exceeds the maximum allowable thickness for many applications. The practice of this invention provides suitable oxide thicknesses for such applications.

A Josephson tunneling device on a Nb film using all Nb metallurgy consists of a Nb film, an ultra-thin insulator which is desirably less than approximately 20 A. thickness and a top Nb electrode. Such devices have not been consistently reproducible in the prior art because of the difficulties of obtaining ultra-thin insulating films on a hard refractory material such as Nb. Other materials may be substituted for Nb. Practice of this invention provides ultra-thin films whose thickness can be controlled in a region where control was not possible before in the prior art. Control of the thickness of such films is important in tunnel devices because a change in thickness of a few percent—2 A.—can change the properties, e.g., Josephson current, of the device by a significant factor, e.g., two or more. This lack of reproducibility has severely limited application of devices which require ultra-thin insulating films.

OBJECTS OF THE INVENTION

It is an object of this invention to provide both a method for fabricating a thin insulating film and the resultant film.

It is another object of this invention to provide a method for fabricating an ultra-thin insulating film on a refractory metal.

It is another object of this invention to provide a method for fabricating ultra-thin insulating films, e.g., anodic oxides, on materials such as niobium, tantalum, aluminum, and niobium-titanium alloys.

It is another object of this invention to fabricate Josephson tunneling memory devices wherein there is a sandwich geometry of superconductor-insulator-superconductor.

It is another object of this invention to fabricate ultra-thin defect-free insulating films.

It is another object of this invention to fabricate a device including an insulating film on a substrate wherein the thickness of the film is controllably determined.

It is another object of this invention to provide a method for fabricating an ultra-thin defect-free insulating film anodically wherein there are included the steps of anodizing a metallic surface to form an initial anodic film, removing the anodic film, and anodizing a subsequent anodic film on the remaining smoothened metallic surface.

It is another object of this invention to fabricate an insulating film on a metal substrate at sufficiently low temperature to prevent deleterious interactions between the insulating film and the metal substrate.

SUMMARY OF THE INVENTION

This invention provides a method for forming thin defect-free anodic films on a smoothened metallic surface.

It was discovered for the practice of this invention that freshly etched Nb films have a negative voltage with respect to a reference cathode. By starting the anodization from this negative potential, and stopping the anodization before zero volts is achieved, anodic oxides of less than approximately 50 A. are reproducibly formed. By repeating the anodizing and etching steps, defects in the metal-metal oxide region are reduced in size.

The method consists of steps for anodizing an initial insulating film on a substrate, removing the film, e.g., by etching, and repeating similar steps until a condition of a desirable smooth surface is produced on the substrate and then the final defect-free film is controllably fabricated thereon, e.g., by anodizing. Illustratively, anodizing current and voltage are controlled so that film growth is controlled to produce insulating films of thickness less than approximately 50 A.

Through the practice of this invention an anodic film is fabricated on a niobium metallic surface having thickness less than approximately 30 A. The anodic film is fabricated by the steps of: establishing said metallic surface as an anodic electrode of an electrolytic cell; and energizing said metallic surface with current driving force between the said metallic surface and cathode electrode of said electrolytic cell having potential less than approximately 1 volt.

The following and other objects, features and advantages of the invention will be apparent from the following more particular description of a preferred embodiment of the invention, as illustrated in the accompanying drawings.

DETAILED DESCRIPTION OF THE DRAWINGS

Figure 1:
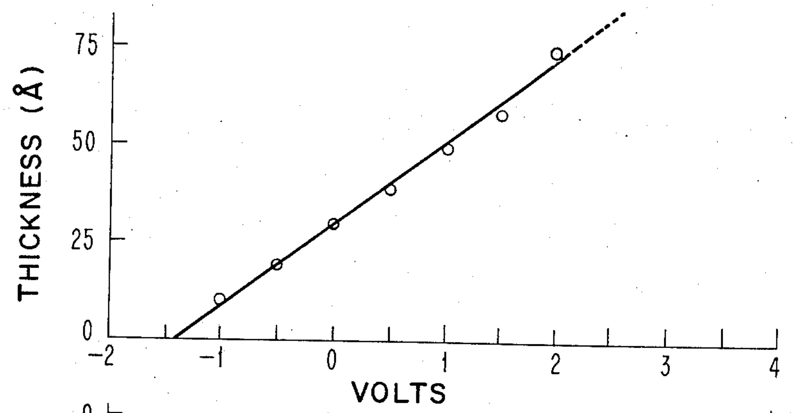
FIG. 1 presents a graph of thickness of an anodic oxide film versus applied voltage illustrating the relatively low voltage region for practice of this invention.
Figure 2:
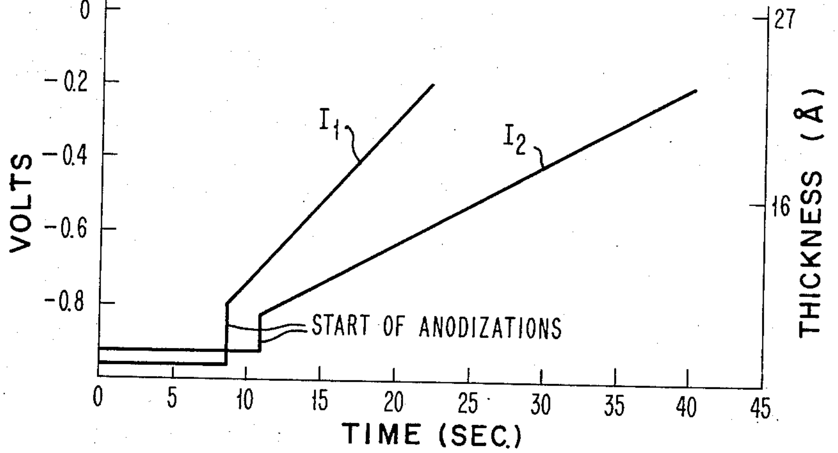
FIG. 2 presents graphs illustrating anodic voltage buildup with time for two applied anodizing currents.

FIGS. 1 and 2 present data concerning anodic oxide films on Nb. In FIG. 1 the thickness in A. is plotted versus the applied voltage. The linear relationship is theoretically explained for the practice of this invention on the basis of Faraday's Law and the dependence of current on the exponential of voltage. The thickness was measured with an ellipsometer, and the voltages were measured with reference to a platinum cathode. The negative voltage is due to the electrolytic cell voltage of anode Nb and cathode Pt. In FIG. 2 the voltage across the electrolytic cell is plotted versus time as the anodic insulating film (oxide of niobium) is forming on the Nb surface for two different constant current sources $I_1$ and $I_2$ connected in the external current path. The time scale has an arbitrary origin. The vertical voltage steps indicate the initiation of the anodization mechanism and the anodization time starts then.

Figure 3:
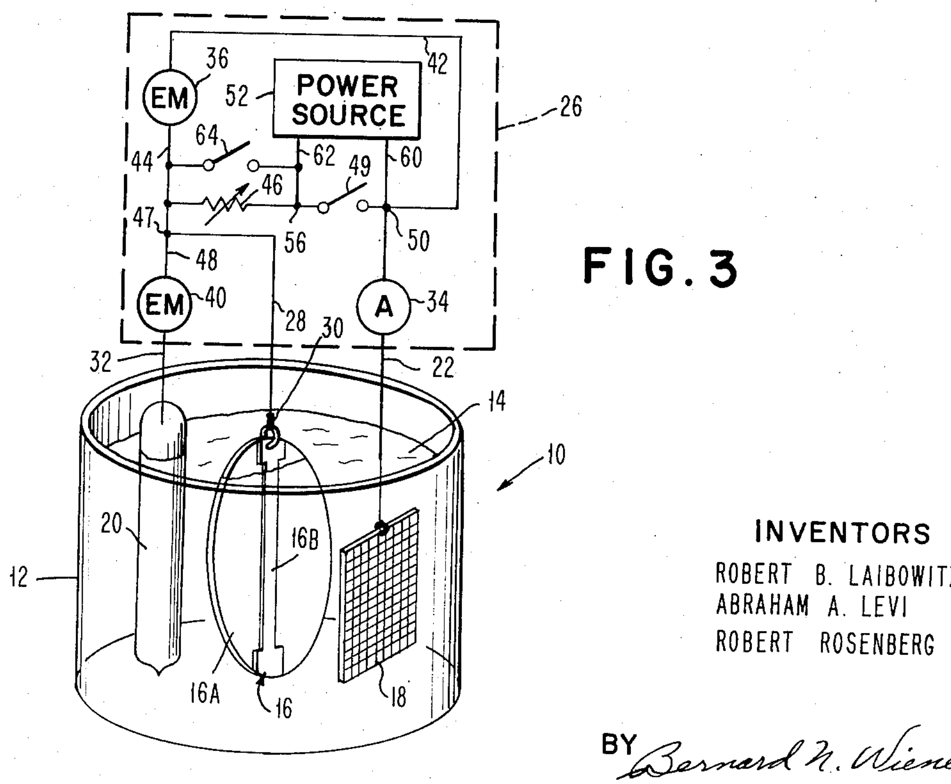
FIG. 3 is a schematic diagram of apparatus suitable for practicing the method of this invention showing a niobium substrate in an electrolytic cell for deposition of an anode oxide film thereon.

FIG. 3 represents a schematic diagram of apparatus suitable for the practice of this invention for anodizing the surface of a niobium substrate to produce an ultra-thin defect-free anodic film thereon. Beaker 12 contains electrolyte 14 within which are positioned niobium substrate 16, cathode electrode mesh screen 18 and reference Calomel electrode 20. For the electrical circuitry and measuring instruments, cathode 18 is connected by conductor 22 to ammeter 34 as part of the measurement and energy source 26. The external electrical circuit connection is completed to niobium substrate 16 via conductor 28 which is clipped to niobium substrate 16 via clip 30 and Calomel reference electrode 20 is connected to the measurement and energy source 26 via conductor 32. Circuitry and instruments in measurement and energy source 26 include ammeter 34 for measuring the current flowing in the cathode-anode external path and electrometers 36 and 40 which measure respectively the voltage drops between the anode 16 and cathode 18 and between the anode 16 and the Calomel reference electrode 20. Electrometer 36 is connected to ammeter 34 via conductor 42 and to conductor 28 via conductor 44, and electrometer 40 is connected to conductor 28 at connection point 47 via conductor 48 and to Calomel reference electrode 20 via conductor 32. Variable resistance 46 is connected between anode 16 and cathode 18 via switch 49 which is connected to ammeter 34 at connection point 50. Power source 52 for establishing current in the anode-cathode external path is connected across switch 49 at points 50 and 56 by conductors 60 and 62. Switch 64 is connected across variable resistance 46 for switching it out when necessary.

Illustratively, the niobium substrate 16 is placed in a proper electrolyte 14, e.g., 0.2 normal $H_2SO_4$ solution, and anodized with up to 1 volt. The oxide is then etched from niobium substrate 16, in a manner which is not illustrated, e.g. in $HF+HNO_3$. The anodizing and etching steps are repeated for the production of defect-free oxides. Small deleterious disturbances on the substrate 16 surface, e.g., cavities and hillocks are preferentially anodized and then removed during the etching step in a manner to be explained theoretically with reference to FIGS. 5A, 5B and 5C. The final anodization is achieved by electrically connecting the two electrodes 16 and 18 through constant current source 52, such that the final thickness of the anodic film is approached slowly and controllably. Alternatively, the two electrodes 16 and 18 are connected through resistor 46 via switch 49 in the closed position with switch 64 in open position to limit the anodization rate and allow control of the rate of film growth. Any thickness of oxide film can be achieved reproducibly in this manner. Illustratively, with reference to FIG. 1, to obtain an 18 A. film, the anodization is terminated when the niobium reaches a potential of −0.4 volt. Alternatively, the curve shown in FIG. 1 may be shifted horizontally by changing the particular cathode used with there being a concomitant change in the 0-voltage thickness.

The use of anodic films provided by the practice of this invention will now be described with reference to FIGS. 4A, 4B and 4C concerning tunnel devices. Additional background information concerning tunnel devices is well known in the prior art.

Figures 4A, 4B, 4C:
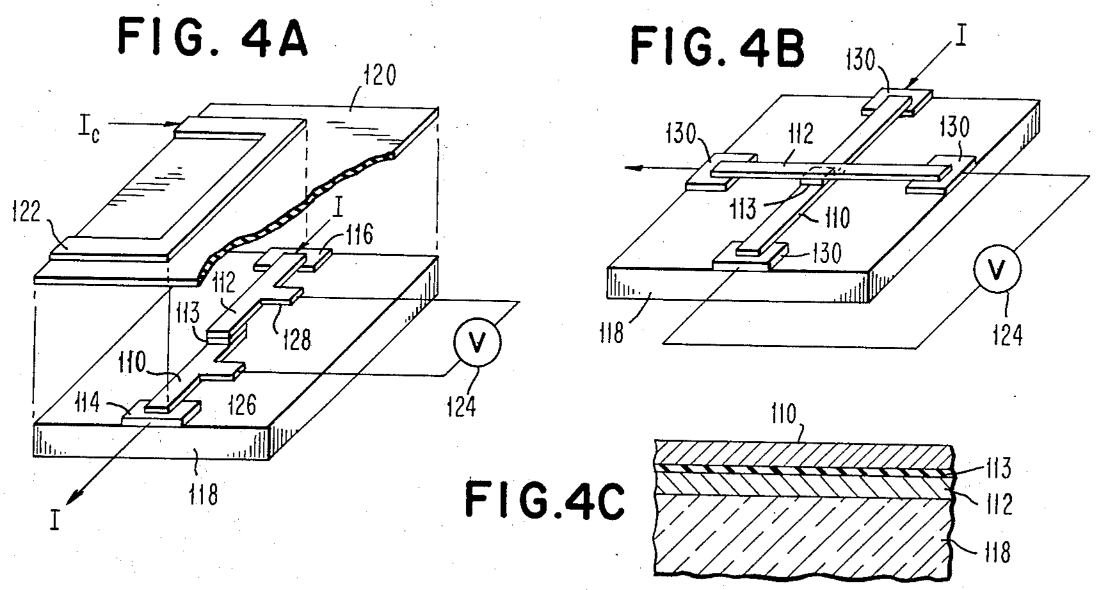
FIGS. 4A and 4B are perspective views and FIG. 4C is a cross-sectional elevation view of an illustrative Josephson tunneling device for which the practice of this invention is suitable.

FIG. 4A shows a thin film tunneling device having an "in-line" geometry. The device itself comprises two current-carrying layers 110, 112 which are separated by a tunnel barrier 113. Attached to the electrodes 110, 112 are lead connectors 114, 116. The entire tunneling device is mounted on the substrate 118. Insulated by layer 120 from the electrodes 110, 112 and disposed over these electrodes is a control element 122. Although the control element 122 is not required, it is shown as a means by which the switching characteristics of the tunneling junction may be controlled. Current, designated $I_C$, flows through control element 122 and sets up a magnetic field which affects the switching characteristics of the tunnel junction. Bias means, such as an external current source, is used to provide tunnel current across the tunnel junction. A meter, such as volt-meter 124, can be used to detect voltage changes across the junction. This meter is connected to electrode 110 by contact 126 and to electrode 112 by contact 128.

If desired, the tunneling device of FIG. 4A can be a Josephson gate if the tunnel barrier 113 is made very thin, in the order of 2–50 angstroms. By "barrier" it is to be understood that what is meant is the potential barrier through which charge carriers tunnel. This does not necessarily correspond with the physical thickness of the layer 113. Preferably, for good Josephson device characteristics, the barrier 113 thickness will be not more than 20 angstroms. The electrodes 110 and 112 are usually 2,000–20,000 A. thick, but can be as thin as about 500 A. If the electrode films become too thin, the superconducting properties, such as critical temperature $T_C$, are effected, and it is then difficult to make reproducibly good devices. In a Josephson device, both electrodes 110, 112 are superconductors and the electrodes remain in the superconducting state while switching.

The control element 122 may be any superconductor, such as lead. The electrodes 110, 112 may be any superconductor material, including compounds and alloys and the tunnel barrier 113 may be an anodic film as provided by the practice of this invention. Presently known Josephson tunnel devices generally use metals such as lead, tin, or indium, for the electrodes 110 and 112. Materials other than oxides can be used as intermediate layers (tunnel barriers), e.g., these include nitrides, sulfides and carbides, all of which may readily be fabricated in accordance with the principles of this invention. Although many materials can be used, it is important that the tunnel barrier be of uniform thickness and be free of defects. Various substrate materials can be used which include quartz, mica, sapphire, metals. Further, a ground plane can be put on the substrate before the devices are fabricated thereon. For conventional thin film tunneling devices, the tunnel barrier is greater than the approximately 20 A. required for Josephson tunnel devices.

FIG. 4B shows a thin film tunneling device having a cross-stripe geometry. For clarity the same reference numerals are used as in FIG. 4A. In this geometry, the top electrode 112 is arranged transversely to the direction of the bottom electrode 110. Electrodes 110, 112 are separated by a thin barrier layer 113 which may be the anodic film provided by the practice of this invention. Lead connectors 130 are provided for connecting external leads to the tunneling device. Current I is provided by an external source, not shown. Any conventional source is suitable. A meter, such as voltmeter 124, is used to detect voltage changes across the junction, caused by a change in tunnel current across the tunnel junction. The entire tunneling gate is supported by a substrate 118. Although no control element is shown, it is to be understood that one could easily be provided in accordance with conventional practice.

FIG. 4C is a cross-sectional view of the tunneling junction of the device shown in FIGS. 4A and 4B. The tunneling junction is comprised of two current carrying electrodes 110, 112 separated by a tunnel barrier 113. Support is provided by the substrate 118. Tunneling current crosses the barrier between the two electrodes. If the barrier is very thin, approximately 2–20 angstroms, and the electrodes are superconductors, Josephson current can flow. For thicker barriers, conventional tunneling will occur. Additional details concerning Josephson tunneling devices are presented generally in the prior art and specifically in copending application Ser. No. 875,615, filed Nov. 12, 1969 and now abandoned and commonly assigned.

EXAMPLES OF THE INVENTION

The practice of this invention will now be exemplified for fabrication of specific examples of anodic films prepared in accordance with the principles of the invention. An anodization cell illustrated in FIG. 3 consisted of a polystyrene beaker 12 mounted on a ring stand, not shown. A phenolic frame, not shown, rested on the beaker 12 and was used to position and hold the electrodes 16, 18 and 20. The electrolytic solution 14 in the cell 10 was brought up to a level so that it did not touch the clip 30.

Example I

The anode 16 consists of a Nb stripe 16B which was deposited by sputtering on a sapphire wafer 16A. The cathode 18 was a carbon plate. The wafer and stripe were etched for 15 sec. in a mixture of $1HF{:}2HNO_3{:}3H_2O$, and then the stripe 16B was anodically oxidized in a 0.2 normal $H_2SO_4$ solution. The initial cell 10 potentials were −0.7 volt. The anodization was at a constant applied voltage of 1 volt from power source 52 with a $10^4$ ohm resistor 46 in series with the cell electrodes, and was stopped when the cell potential reached +0.9 volt as read on electrometer 36. The example was etched for 15 sec. in the $HF$-$HNO_3$ etchant and again anodized to +0.9 volt as measured by electrometer 36. The example was etched a third time for 30 sec. in the $HF$-$HNO_3$ etchant and then finally anodized to 0 volts. Three niobium stripes were evaporated by a conventional electron gun technique on the final oxide surface at room temperature to form tunnel junctions.

Example II

A niobium stripe 16B was deposited on a sapphire wafer 16A by conventional radio-frequency sputtering. The wafer and stripe were etched for 15 sec. in a mixture of $1HF{:}2HNO_3{:}3H_2O$, and then anodically oxidized in a 0.2 normal $H_2SO_4$ solution. The initial cell potentials were −0.8 volt with a carbon plate as cathode 18. The first anodization was with 1 volt applied potential with a $10^4$ ohm resistance 46 in series with the cell which was stopped at 0.9 volt as read on electrometer 36. The example was etched in the $HF$-$HNO_3$ mixture and anodized with 1 volt applied potential from power source 52 and a $2\times10^4$ ohm resistance in series with the cell, until a potential of −0.2 volt was observed by electrometer 36 connected across the cell. Three niobium stripes were evaporated on the anodic oxide to form tunnel junctions. Josephson currents of 10–15 milliamperes were observed.

Example III

A niobium stripe 16B was deposited on a sapphire wafer 16A by conventional radio-frequency sputtering.

The wafer and stripe were etched in concentrated HF acid for 65 sec. and then the stripe was anodically oxidized in 0.2 normal $H_2SO_4$ solution. The initial electrolytic cell potential was −0.8 volt as read by electrometer 36 with a carbon plate as cathode 18. The anodization was with 1 volt applied potential with a $10^4$ ohm resistance in series with the electrolytic cell, and was stopped at +0.9 volts. The example was then etched for 15 sec. in concentrated HF acid and then anodized to −0.15 volt with $2\times10^4$ ohm resistance in series with the cell and 1 volt applied potential. The example was etched again in concentrated HF acid for 15 sec. and then anodized to −0.15 volt with a $5\times10^4$ ohm series resistance and 1 volt applied potential from power source 52. Three niobium stripes were evaporated by conventional electron gun technique on the anodic oxide surface at 77° K. Josephson device currents of 2–7 milliamperes were observed.

Example IV

A niobium stripe 16B was deposited on a sapphire wafer by conventional radio-frequency sputtering. The wafer and stripe were etched for 15 sec. in concentrated HF acid, and then anodically oxidized in 0.2 normal $H_2SO_4$. The anode potential was measured with reference to a Calomel electrode by electrometer 40. A platinum screen was used as the cathode 18. The initial anodization was carried out at a constant current of 100 milliamperes and was stopped at 1.4 volts above the initial potential. The sample was etched in concentrated HF acid for 15 sec. and anodized at a constant current of 10 microamperes to 0.6 volt above the initial potential.

Three niobium stripes were evaporated by conventional electron gun technique on the oxide surface at 77° K. Josephson device currents of 2–6 milliamperes were observed.

THEORY OF THE INVENTION

Electrochemical anodization is used in the practice of this invention to grow an oxide of uniform thickness on a metal surface. The film is produced because of the following physical mechanisms:

(a) An anodic reaction in aqueous solution is due to a transfer of electrons and ions. The anodic reaction can be written as $$xM+2yOH^- \rightarrow M_xO_y+yH_2O+2ye$$

where M=metal, $x$ and $y$ are numbers, $e$=electron. The anodizing current is related to the rate at which ions are transported. The rate and magnitude of the anodic reactions are described by Faraday's law, i.e., thickness is proportional to the product of current and time.

(b) The resistivity of the anodic oxide is proportional to the thickness of the oxide at any particular point thereon.

(c) Current is inversely proportional to the resistance in the electrolyte cell current path and seeks the path of lowest resistance.

When an anodic oxide is not uniform in thickness, the current will be greater in the thinner, i.e., lower resistivity regions, and the anodic reaction and anodic oxide buildup will be greater thereat and will continue until a uniform thickness is attained. Therefore, the electrochemical-physical mechanism is self-monitoring and self-controlling for growing films of uniform thickness in accordance with the principles of this invention.

Figure 5A:
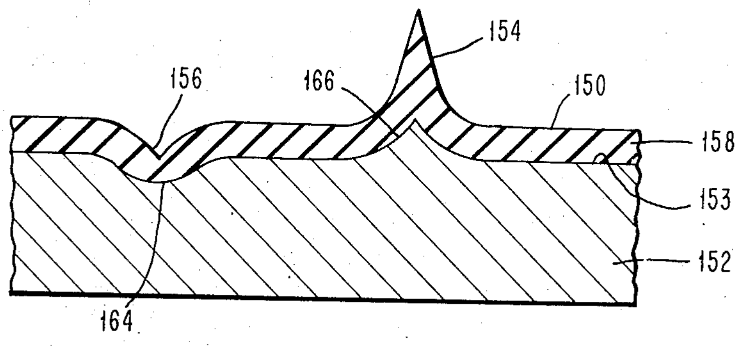
FIGS. 5A, 5B and 5C are line drawings of sectional views illustrating a theoretical explanation of the way practice of this invention removes cavities and growths from a metal surface.
Figure 5B:
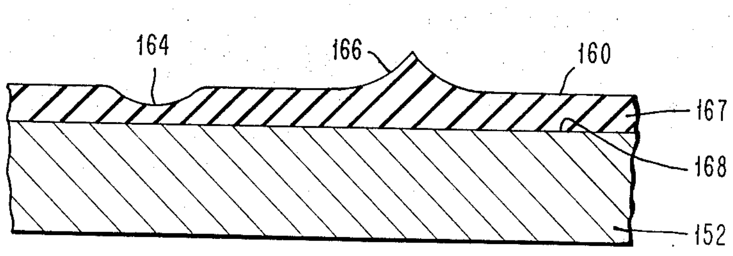
Figure 5C:
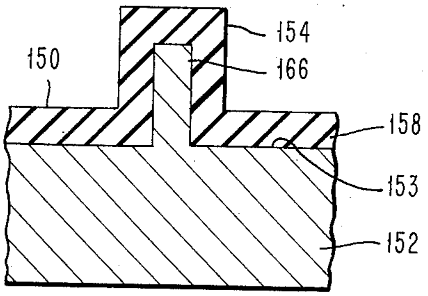

FIG. 5A, 5B and 5C are line diagrams of sectional views illustrating the nature of defects in the metallic surface and for one physical mechanism by which the practice of this invention removes the defects by the steps of anodizing, etching and anodizing.

In FIG. 5A an original metal surface 150 on metal 152 has an exemplary hillock 154 and an exemplary cavity 156. Such defects frequently appear in metallic surfaces during formation of the metallic film by conventional techniques. Further, it is most unlikely to prepare a metal surface without there being present defects of the character of cavities and hillocks. Subsequent to anodization of the metallic surface 150 there is present on the metal 152 an oxide layer 158 which grows thereon at expense of consumption of metal at the surface of the metal 152. Thus, the surface structure of the metal at the metal:oxide interface 153 consists of shallower cavities and lower peaks than the original metal surface 150.

PRACTICE OF THE INVENTION

After the anodization an etchant is used to remove selectively the metal oxide from the metal surface. Specifically, hydrofluoric acid attacks niobium oxide but not niobium and may be used to remove selectively niobium oxide from niobium.

FIG. 5B shows the metal 152 after anodizing etching and re-anodizing steps in the practice of this invention have occurred. For the particular metal 152 the oxide surface 160 reproduces surface 153 with cavity 164 and peak 166 and the metal:oxide interface 168 is shown without peaks or cavities. Thus, upon the etching of metal 152 and removal therefrom of the oxide film 167, the surface 168 of metal 152 is considered to be defect-free for device application.

It should be realized that the term "defect-free" is relative since the character of the surface 168 is experssed either in terms of magnification with which it is observed or in terms of performance of a device. The importance for the practice of this invention of removing the oxide 167, is that the surface 168 upon which the final oxide is grown is sufficiently smooth so as to not to have any significant deleterious effect upon the device operation. Illustratively, the surface 168 may have relative long wavelength modulations which do not affect substantially the final device operation.

FIG. 5C is a line diagram of the character of a hillock 154 shown in somewhat more idealistic form than in FIG. 5A in order to illustrate one physical mechanism by which an anodic film grown on the metallic surface diminishes the presence of the hillock during the growth thereof.

When a surface 150 as shown in FIGS. 5A and 5C with protrusions 154 and cavities 156 is anodically oxidized, the thickness of the oxide is dependent on the nearest surface point and is uniform in distance from the surface. When a protrusion completely fills with oxide, the oxide to metal interface is then less irregular than the starting metal surface 150. When the anodic oxide is selectively removed, the resultant metal surface is sufficiently smooth for device application. The smoothing effect is dependent on the thickness of the anodic oxide, and on the number of times the anodizing and etching steps are repeated.

It should be noted also that the presence of defects such as protrusions and depressions lead to high electric fields which then cause preferential anodization of these defects which accelerates the smoothing of the metal surface.

CONSIDERATIONS FOR THE INVENTION

The practice of this invention has been described hereinbefore primarily with reference to use of the insulating film provided thereby in a Josephson tunnel device. However, any type of tunnel device which requires a thin insulating film can be desirably benefited by the practice of this invention. Illustratively, normal nonsuperconductive materials may be used as well as superconducting electrodes to form tunnel junctions in which Josephson current is not observed. Further, certain devices require thicker insulating films than those useful for tunnel devices. For such purposes if the initial ultra-thin layer of the insulating film is not defect-free, the final and thicker film is more susceptible to breakdown and distortion. Illustratively, for the prior art switchable resistor, an insulating film provided by the practice of this invention of approximately 250 A. thickness and greater is particularly suitable. The practice of this invention is also useful for providing passivating films for protection of supporting structures for devices.

In the practice of this invention for providing an insulating film on a substrate, the substrate may be of various materials, and various solutions may be used as the anodizing bath. Further, the practice of this invention is contemplated for anodization which occurs via a fluid such as a gas or plasma rather than with an electrolyte liquid.

What is claimed is:

1. Method for fabricating an anodic insulating film comprising the steps of:
   establishing a substrate with an electrically conducting surface thereon;
   establishing said substrate in an electrolyte for providing ions which form a chemical compound with said electrically conducting surface of said substrate;
   establishing an electrode in said electrolyte for forming an electrolytic cell with said electrically conducting surface, said conducting surface having negative potential relative to said electrode;
   providing an external current path between said electrically conducting surface on said substrate and said electrode;
   energizing said external current path temporally with potential between said surface and said electrode including said negative potential for a period to initiate and grow an anodic film on said electrically conducting surface having thickness less than approximately 50 A.

2. Method for fabricating an anodic insulating film comprising the steps of:
   establishing a substrate with an electrically conducting surface thereon;
   establishing said substrate in an electrolyte for providing ions which form a chemical compound with said electrically conducting surface of said substrate;
   establishing an electrode in said electrolyte for forming an electrolytic cell with said electrically conducting surface;
   providing an external current path between said electrically conducting surface on said substrate and said electrode;
   energizing said external current path temporally for a period to initiate and grow and anodic film on said electrically conducting surface having thickness less than 30 A.

3. Method as set forth in claim 2 wherein said substrate is niobium.

4. Method as set forth in claim 2 wherein said electrolyte contains oxygen containing ions.

5. Method as set forth in claim 2 wherein said energizing of said external current path is by potential less than approximately 1 volt.

6. Method for controlling the thickness of an anodic film comprising the steps of:
   establishing a metallic surface in an electrolytic cell as an anode thereof, said electrolytic cell including an electrolyte and a reference cathode, said metallic surface having negative potential relative to said reference cathode;
   initiating an anodic reaction at said metallic surface between constituents of said metallic surface and negative ions of said electrolyte;
   growing said anodic film with thickness less than approximately the maximum thickness of the zero volt anodic film with potential between said anode and said reference cathode including said negative potential.

7. Method for smoothing a metallic surface having a defect therein comprising the steps of:
   removing residual insulating film present on said metallic surface;
   anodizing said metallic surface to form an anodic film thereon consisting of a compound of said metallic film and leaving a remaining metallic surface;
   removing said anodic film from said remaining metallic surface; and
   repeating said latter two steps sequentially until the final metallic surface has a given smoothness.

8. Method as set forth in claim 7 wherein:
   said removing of said anodic film is accomplished by etching in an acidic solution.

9. Method as set forth in claim 7 wherein:
   said defect is selected from the group consisting of growths and cavities.

10. Method as set forth in claim 9 wherein:
   said growths include at least one member of the group consisting of hillocks and whiskers.

11. Method for fabricating an insulating film on a conducting surface comprising the steps of:
   anodizing said conducting surface electrolytically in an electrolytic cell to grow thereon an anodic film of a first given thickness;
   removing said anodic film from said conducting surface;
   repeating said anodizing and removing steps at least once to provide a resultant conducting surface; and
   anodizing said resultant surface to a second given thickness.

12. Method as set forth in claim 11 wherein said second given thickness is less than approximately 50 A.

13. Method as set forth in claim 11 wherein said removing is accomplished by etching.

14. Method as set forth in claim 13 wherein said etching is accomplished in an acid selected from the group of HF and $HF+HNO_3$.

15. Method as set forth in claim 11 wherein said conducing surface is a refractory metal.

16. Method as set forth in claim 15 wherein said refractory metal is niobium.

17. Method of claim 11 wherein electrolyte fluid in said electrolytic cell provides ions for reaction with said conducting surface.

18. Method as set forth in claim 17 wherein said electrolyte fluid contains oxygen containing ions.

19. Method as set forth in claim 17 wherein said fluid is a liquid.

20. Method as set forth in claim 19 wherein said liquid is an aqueous solution.

21. Method as set forth in claim 20 wherein said aqueous solution is 0.2 normal $H_2SO_4$ solution.

22. Method for fabricating a device including a tunnel junction therein comprising the steps of:
   establishing a superconductor metallic film having a surface on a substrate therefor;
   removing significant defects from said surface of said metallic film including the steps of anodizing said surface to form an anodic film thereon and removing said anodic film;
   and forming an insulating film on said metallic surface by anodizing said surface.

23. Method as set forth in claim 22 wherein said tunnel junction is a Josephson tunnel junction and said anodic film has thickness less than approximately 30 A.

References Cited

UNITED STATES PATENTS

| | | | |
|---|---|---|---|
| 3,436,258 | 4/1969 | Neugebauer et al. | 204—56 R |
| 3,466,234 | 9/1969 | Cohen et al. | 204—56 R |
| 3,398,067 | 8/1968 | Raffalovich | 204—35 N |
| 3,180,807 | 4/1965 | Quinn | 204—38 A |

HOWARD S. WILLIAMS, Primary Examiner
W. I. SOLOMON, Assistant Examiner

U.S. Cl. X.R.

204—35 N, 56 R; 317—234 T